April 24, 1928.
H. H. BOYCE
1,667,026
INDICATING INSTRUMENT FOR AUTOMOBILE RADIATOR CAPS AND THE LIKE
Original Filed Oct. 31, 1917
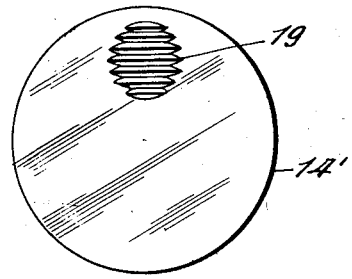
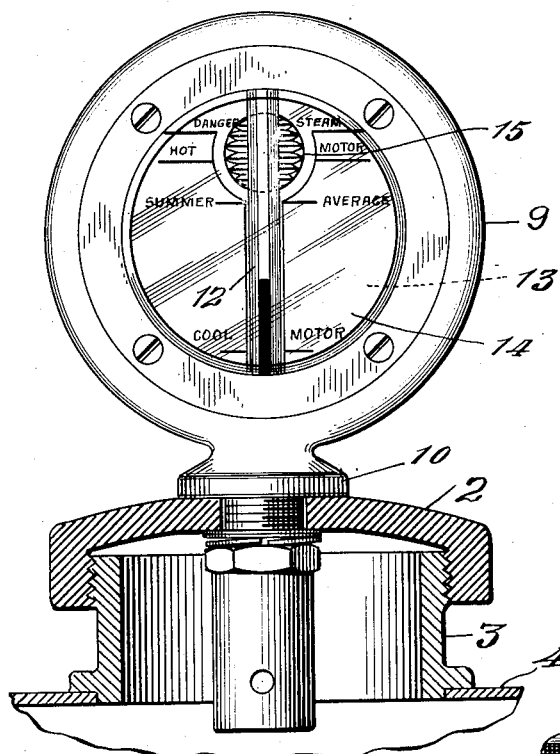
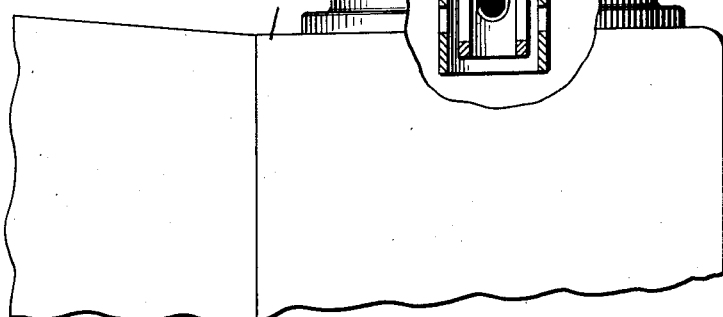

Patented Apr. 24, 1928.

1,667,026

UNITED STATES PATENT OFFICE.

HARRISON H. BOYCE, OF JERICHO, NEW YORK.

INDICATING INSTRUMENT FOR AUTOMOBILE RADIATOR CAPS AND THE LIKE.

Original application filed October 31, 1917, Serial No. 199,413. Divided and this application filed January 19, 1922. Serial No. 530,274.

This invention relates to the construction of indicating instruments adapted to be mounted on the radiators or radiator caps of automobiles or any other locations where similar conditions might exist.

This application is a division of my application Serial No. 199,413, filed October 31, 1917.

In my Patent No. 1,275,654, dated August 13, 1918, I have disclosed an instrument for indicating engine temperature adapted to be mounted on the radiator cap of an automobile and so constructed as to be readable from the driver's seat. One feature of such an instrument which is claimed particularly in the aforesaid patent, relates to the construction of an instrument with a window or opening across which a liquid indicating column or other indicating member is adapted to pass so as to throw into relief the indications of the instrument and to render it more easily readable particularly at night. With this construction, however, I find that in some cases where side lights or spot lights are used which illuminate the face of the instrument, the indicating element of the latter is less clearly visible when in front of the window; and also that when there is no direct illumination of the face of the instrument, the indicating element is not always as clearly silhouetted against the head-light beams as is desirable. The present invention relates particularly to a construction for facilitating the reading at night of an instrument when lighted by a direct illumination thrown on its face as well as when lighted from the other side. Generally stated, the invention hereinafter claimed is characterized by the provision, in an instrument of the kind mentioned, of a crystal having a grooved or prismatic area registering with the window of the instrument, and serving not only as a background when the face of the instrument is illuminated but also as a means for improving the silhouetting of the indicating column or other indicating member against the head-light beams, when there is no direct illumination of the face of the instrument.

In the accompanying drawings, in which I have shown a specific form of the invention as illustrative of the principle thereof and of the best mode known to me for practicing the invention, Figure 1 is a face view of the instrument; Figure 2 is a vertical sectional view of the instrument; and Figure 3 is a face view of the crystal which may be employed in carrying out the invention.

Referring to the drawing, Figure 1 shows in elevation an instrument which is adapted to be mounted in a prominent place in front of the driver of a vehicle, ordinarily on the cap 2 which makes threaded engagement with the top of the stem 3 of a radiator. The instrument comprises a frame 9 having a base 10 adapted to be clamped on the radiator cap 2, the indicating element of the instrument comprising a glass tube thermometer 12 extending across the frame 9. At the side of the glass tube away from the driver's seat, is a dial plate 13, the glass tube and dial plate being, in the construction illustrated, enclosed between glass crystals 14 and 14'. In the dial plate, is an opening or window 15, across which the thermometer tube passes. The side of the thermometer tube adjacent the dial plate may be whitened in a manner usual in thermometer construction, so as to throw the indicating column into relief, but this whitening preferably terminates at the lower edge of the window 15, so as not to interfere with the transparency of the tube where it crosses the window.

The present invention relates to means for enhancing the visibility of the indicating column at night, and comprises means for catching light rays from whatever source they may come and forming a transparent or translucent background particularly for that portion of the column which passes across the window 15; and one form of this means will now be described. As illustrated in the drawing, the crystal 14' back of the window 15 is provided with a grooved area 19, producing practically a series of prisms which form a background while at the same time permitting the silhouetting of the indicating column against the head-light beam when there is no direct illumination of the face of the instrument. This prismatic portion, registering with the window 15 and forming a background for the indicating element, increases the visibility of the indicating column at the most important portion thereof.

While I have illustrated and described in detail a preferred embodiment of my invention, it is to be understood that my invention is not limited to such constructions. I, therefore, intend to cover the invention broadly in whatever form its principle may be employed.

What I claim is;

1. In an instrument of the character described, a frame, an indicating dial mounted therein having a window, indicating means arranged for movement across said dial and window, and a crystal having a prismatic portion registering with said window and mounted in said frame on that side of said dial and indicating means which is away from the side from which said indicating means is intended to be observed.

2. In an instrument of the character described, a frame, a dial mounted therein having a window, indicating means arranged for movement across said window, a crystal mounted in said frame on the side of the dial from which the indicating means is intended to be observed, and another crystal having a prismatic portion registering with said window and mounted in said frame on that side of said indicating means and dial which is away from the side from which said indicating means is intended to be observed.

3. In an instrument of the character described, an indicating element and a crystal forming a background therefor and situated at a short distance behind the element and provided with a grooved portion of greater width than the element.

4. In an instrument of the character described, an indicating element and a background spaced a short distance therefrom consisting of a crystal having a series of prisms which form a background traversed by the indicating element, said instrument being constructed and arranged to permit light from said background and element to reach the eye substantially without obstruction.

5. In an instrument of the character described, a frame, a crystal mounted in the side of said frame from which said instrument is intended to be observed, a crystal in the other side of said frame provided with a series of prisms, and temperature indicating means embodying a transparent tube arranged between said crystals, said instrument being constructed and arranged to permit light from said background and element to reach the eye substantially without obstruction.

6. In an instrument of the character described, a frame, a crystal mounted in the side of said frame from which said instrument is intended to be observed, another crystal in the other side of said frame provided on its inside with a series of prisms, and temperature indicating means embodying a transparent tube arranged between said crystals, said instrument being constructed and arranged to permit light from said background and element to reach the eye substantially without obstruction.

7. In an instrument of the character described, a frame, a crystal having continuous inner and outer plane surfaces mounted in the side of said frame from which said instrument is extended to be observed, another crystal provided on its inside with a series of prisms and mounted in the other side of said frame, and temperature indicating means embodying a transparent tube arranged between said crystals.

In testimony whereof I have affixed my signature to this specification.

HARRISON H. BOYCE.